Lloyd G. Alexander  Inventor

United States Patent Office 3,064,481
Patented Nov. 20, 1962

3,064,481
SAMPLING DEVICE
Lloyd G. Alexander, Edmonton, Alberta, Canada, assignor to Jersey Production Research Company, a corporation of Delaware
Filed Sept. 3, 1959, Ser. No. 837,880
4 Claims. (Cl. 73—422)

The present invention relates to a device for obtaining samples from a fluid stream. It relates especially to a device for taking respresentative proportional samples from a flowing fluid.

In flowing fluids in confined streams, such as in pipe lines, it is usually desired to know what fluid, or fluids, is flowing therein. A convenient way to determine the nature of the fluid is to take representative samples from the stream and subsequently analyze the samples. It is desired that the samples taken be representative of the fluid flowing and also that the amount of the samples taken be relatively small. Various automatic samplers have been devised. However, the conventional samplers require a sample tap in the line from which the sample is obtained. The conventional samplers are also difficult to adjust to give a sufficiently small sample, which is still representative of the fluid stream. The sampler disclosed by this invention obtains representative samples of very small volume and are proportional to the flow of the fluid. Also in the present invention, no tap line is required to convey the sample fluid from a tap in the line to a sampling device.

One object of the present invention is to provide a device for taking a representative sampling from a fluid stream.

Figure 1:
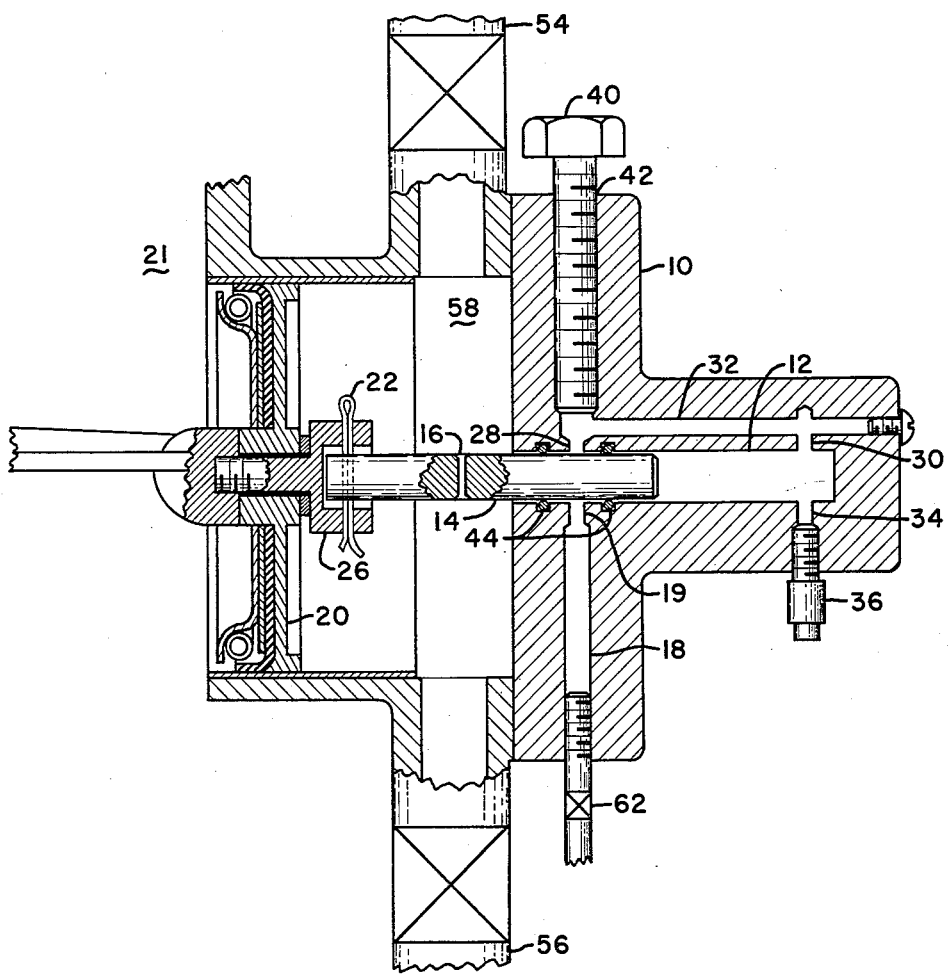
Figure 2:
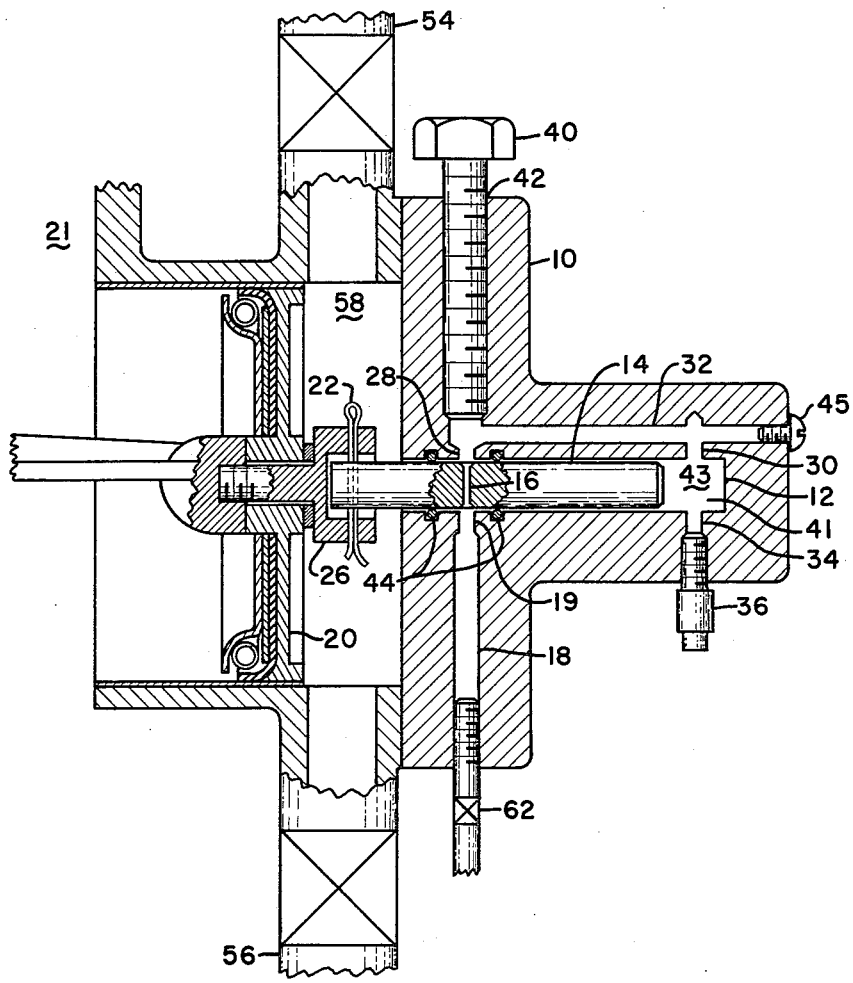

Another object of the present invention is to provide an apparatus for automatically taking samples from a fluid stream which are representative of the fluids in the stream. Other objects and advantages of the present invention will appear from the following description taken in conjunction with the accompanying drawing in which:

FIG. 1 is a cross-sectional view of a device, according to the present invention; and FIG. 2 is similar to FIG. 1, except the sampler is in a sample discharging position.

Referring to the drawing, it is seen that the device includes a housing 10 having a cylinder or bore 12 defined therein. A piston or plunger 14 is slidably fitted within bore 12. Plunger 14 has a lateral sample cavity or passage 16. Bore 12 has laterally aligned outlet port means 19 and compressed air inlet port means 28. Sample discharge conduit 18 establishes fluid communication between port 19 and the exterior of the apparatus.

Plunger 14 is connectable to piston 20 of a displacement type piston meter or to any member having reciprocating motion that is associated with a pump or meter. Piston 20 may represent any piston of a pump or a meter. A suitable meter is manufactured and sold by the A. O. Smith Company with a factory at 5715 Smith Way Street, Los Angeles 22, California. A suitable meter is designated by that company as a model A.P.M. meter. Piston 20 may be secured to plunger 14 conveniently by pin 22 and bolt 26. This connection is such that reciprocating motion of piston 20 is also transferred to plunger 14.

In a preferred embodiment, when piston 20 and plunger 14 are in a top dead center position, i.e., completed its compression stroke in bore 12 as shown in FIG. 2, sample passage 16 of plunger 14 is aligned with port 19 and port 28. Port 28 is laterally spaced from port 19 of discharge conduit 18. Port 30, in the rearward end of bore 12, is fluidly connected to port 28 by a passageway or conduit means 32.

Air inlet port means or conduit means 34 fluidly connects the compression or rearward end of bore 12 with the atmosphere. A check valve 36 is provided in conduit 34 and prevents the flow of air from bore 12 outwardly.

Bolt hole 42 is spaced laterally from conduit 18 and is in fluid communication with conduit 32. A nut 40 is screwed into bolt hole 42. By adjusting bolt 40 the effective clearance volume in bore 12 may thus be adjusted. At this point it is well to note that the effective clearance volume reservoir 43 includes the rearward end 41 of bore 12 not occupied by plunger 14, conduit 32 and that part of bolt hole 42 not occupied by bolt 40.

Sealing means 44 are provided on either side of port 28 and port 19. These seals form a sealable and slidable relationship between the inner wall of bore 12 and plunger 14. Suitable seals 44 may be O-rings. A screw 45 closes one end of conduit 32. The arrangement of the bore, ports, and conduits in housing 10 are arranged to facilitate construction.

The main fluid stream measured by piston meter 21 enters through inlet valve means 54 and is discharged out through discharge outlet valve means 56. Inlet valve means 54 and outlet valve means 56 are illustrated only schematically in connection with piston 20 and chamber 58, as such valve means are well known and their inclusion is not believed necessary for a complete understanding of the invention.

FIGS. 1 and 2 are similar, except different positions of piston 20 and plunger 14 are illustrated. In FIG. 1, piston 20 has just completed its suction stroke and has not started its discharge stroke. It is seen in FIG. 1 that sample passage 16 is in fluid communication with the chamber 58. Fluid in chamber 58 will thus flow into sample passage 16. In FIG. 2, piston 20 has just completed its discharge stroke. Sample passage 16 is then aligned with port 28 and with port 19 and is in fluid communication with discharge conduit 18.

Having briefly described the nature of one embodiment of the automatic sampler, attention is now directed toward a brief discussion of its operation. Nut 40 is adjusted to set the effective size of clearance reservoir volume 43. During the sample taking stroke, piston 20 moves to the left to a position as illustrated in FIG. 1. During this stroke of the piston, two things occur: (1) A small portion of the fluid to be sampled which is in chamber 58 enters passage 16 of plunger 14; and (2) air flows in through check valve 36 and air conduit means 34 into clearance volume reservoir 43. During the discharge stroke of piston 20, that is, when the fluid is discharged through outlet valve means 56 from chamber 58, plunger 14 moves to the right and at the end of the discharge stroke has a position illustrated in FIG. 2. During the discharge stroke, plunger 14 compresses the air in clearance volume reservoir 43. When sample passage 16 aligns with port 28 and port 19, the compressed air forces fluid from sample passage 16 through sample discharge conduit 18. It is thus seen that for each stroke of piston 20, a separate sample is taken. The size of the sample obtained is fixed by the size of passage 16. It is, of course, recognized that the size of passage 16 can be adjusted as desired. The sample size can also be adjusted by adjusting nut 40 which adjusts the size of clearance volume reservoir 43. This permits varying the amount of compression of the air in the clearance volume reservoir. If the volume of the reservoir is increased, there will be less air pressure available and only a portion of the fluid will be ejected from passage 16 on each stroke. A needle valve 62 in sample discharge conduit 18 can partly close conduit 18, thereby reducing the amount of fluid ejected from passage 16 on each stroke.

While a specific embodiment of the present invention has been disclosed, it is obvious that various modifications may be made without departing from the scope thereof.

It is intended that the scope of this invention be limited only by the following claims and not by the specific embodiment described herein.

What is claimed is:

1. A device for obtaining fluid samples from a container which comprises: a housing, a bore in said housing with one end opening into said container, conduit means establishing fluid communication between the other end of said bore and the exterior of said housing, check valve means in said conduit means of a character to permit flow only inwardly to said bore, a plunger adapted to sealingly and slidingly fit within said bore, said plunger having a lateral passage therethrough, a passageway extending from said other end of said bore to an intermediate point on said bore and spaced from said other end, a discharge port means from said bore to the exterior of said housing and opening into said bore laterally from the opening of said passageway at said intermediate point, said lateral port passage of said plunger is aligned with said discharge port means when said plunger is in one extreme position and said lateral passage of said plunger being in said container when said plunger is in its opposite extreme position.

2. A device for removing fluid samples from a stream comprising a housing having a bore open at one end and closed at the other end, a conduit means establishing fluid communication from the closed end of said bore and the exterior thereof, a check valve in said conduit means, a plunger adapted to reciprocate within said bore, said plunger having a lateral passage therethrough, a discharge port in said bore so positioned as to align with said lateral passage of said plunger when said plunger is in one extreme position, said lateral passage of said plunger being exterior said bore when said plunger is in its other extreme position, second conduit means extending from said port to the exterior of said housing, and a passageway in said housing arranged to establish fluid communication from the closed end of said bore through said lateral passage to said discharge port when said lateral passage and said discharge port are in communication one with the other.

3. A device for removing fluid samples from a stream comprising a housing having a bore therein, one end of said bore opening into said stream and the other end of said bore being its compression end; a plunger reciprocably mounted in a sealing relationship within said bore; a sampling reservoir means in said plunger; means to reciprocate said plunger such that said sampling reservoir means is alternately in said stream and in said bore; discharge conduit means establishing fluid communication from the interior of said bore to the exterior of said housing, said sampling reservoir means being in fluid communication with said conduit means when said plunger is in one reciprocable position in said bore; a conduit means establishing fluid communication from the compression end of said bore and the exterior thereof, a check valve in said conduit means, and a passageway in said housing arranged to discharge fluid from the compression end of said bore through said sampling reservoir means to said conduit means when said discharge conduit means are in communication with one another.

4. An apparatus as defined in claim 2 including means to adjust the effective volume of said passageway.

References Cited in the file of this patent
UNITED STATES PATENTS

| | | |
|---|---|---|
| 2,116,265 | Hejduk | May 3, 1938 |
| 2,217,855 | Bassler | Oct. 15, 1940 |
| 2,598,535 | Green | May 27, 1952 |